United States Patent
Hammerschmidt et al.

(10) Patent No.: US 10,567,034 B2
(45) Date of Patent: Feb. 18, 2020

(54) TIME INSTANT REFERENCE FOR ULTRA WIDEBAND SYSTEMS

(71) Applicant: Apple Inc., Cupertino, CA (US)

(72) Inventors: Joachim S. Hammerschmidt, Mountain View, CA (US); Eren Sasoglu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/229,746

(22) Filed: Dec. 21, 2018

(65) Prior Publication Data

US 2019/0199398 A1    Jun. 27, 2019

Related U.S. Application Data

(63) Continuation of application No. 15/681,968, filed on Aug. 21, 2017, now Pat. No. 10,171,129.
(Continued)

(51) Int. Cl.
*H04B 1/71* (2011.01)
*H04B 1/717* (2011.01)
(Continued)

(52) U.S. Cl.
CPC ........ *H04B 1/7172* (2013.01); *G01S 13/0209* (2013.01); *G01S 13/765* (2013.01);
(Continued)

(58) Field of Classification Search
CPC .............. H04B 1/7172; H04B 1/71637; H04B 1/71632; H04B 1/7183; G01S 13/0209; G01S 13/765; H04W 64/00
See application file for complete search history.

(56) References Cited

U.S. PATENT DOCUMENTS 10,171,129 B1    1/2019 Hammerschmidt et al.
2009/0072876 A1    3/2009 Kim et al.
(Continued)

FOREIGN PATENT DOCUMENTS

KR    10-2009-0028286    3/2009
WO    WO 2014/011485 A1    1/2014

OTHER PUBLICATIONS

Office Action from Korean Patent Appl. No. 10-2018-0077344, dated Dec. 5, 2019, 21 pages with English translation.

*Primary Examiner* — Kabir A Timory
(74) *Attorney, Agent, or Firm* — Sterne, Kessler, Goldstein & Fox, P.L.L.C.

(57) ABSTRACT

Embodiments enable communicating Ultra Wideband (UWB) devices to collaborate by exchanging pulse shape information. The UWB devices use the pulse shape information to improve ranging accuracy. The improved ranging accuracy can be used in complex multipath environments where advanced estimation schemes are used to extract an arriving path for time-of-flight estimation. To determine the pulse shape information to be shared, some embodiments include determining location information of a UWB device and selecting the pulse shape information that satisfies regional aspects. The pulse shape information includes a time-zero index specific to a ranging signal that is used by UWB receivers to establish timestamps time-of-flight calculations. Some embodiments include measuring performance characteristics and selecting different pulse shape information based on the performance characteristics for improved accuracy.

20 Claims, 10 Drawing Sheets

Related U.S. Application Data

(60) Provisional application No. 62/528,343, filed on Jul. 3, 2017.

(51) Int. Cl.
    *H04L 25/03*     (2006.01)
    *H04W 64/00*     (2009.01)
    *G01S 13/02*     (2006.01)
    *G01S 13/76*     (2006.01)
    *H04B 1/7163*     (2011.01)

(52) U.S. Cl.
    CPC ... *H04B 1/71632* (2013.01); *H04L 25/03834* (2013.01); *H04W 64/00* (2013.01)

(56) References Cited

U.S. PATENT DOCUMENTS

| | | | |
|---|---|---|---|
| 2010/0225541 A1* | 9/2010 | Hertzog | G01S 5/0221 342/387 |
| 2011/0294450 A1* | 12/2011 | Budianu | H03K 5/082 455/245.1 |
| 2013/0322562 A1* | 12/2013 | Zhang | H04B 7/0404 375/267 |

* cited by examiner

TIME INSTANT REFERENCE FOR ULTRA WIDEBAND SYSTEMS

CROSS-REFERENCE TO RELATED APPLICATION

This application is a continuation of U.S. application Ser. No. 15/681,968, filed on Aug. 21, 2017, entitled, Pulse Shaping Interoperability Protocol for Ultra Wideband Systems, which claims priority to U.S. Provisional Patent Application No. 62/528,343, filed on Jul. 3, 2017, entitled Pulse Shaping Interoperability Protocol for Ultra Wideband Systems, both of which are incorporated herein by reference in their entireties.

BACKGROUND

Field

The described embodiments generally relate to techniques for Ultra Wideband (UWB) communications.

Related Art

An Ultra Wideband (UWB) system is a wireless communication system utilizing short wireless radio pulses. Such a system may be referred to as an "Impulse Radio UWB system." By using short pulses emitted at a desired carrier frequency, a wide portion of the wireless spectrum such as several 100 MHz or even multiple GHz of spectrum around the carrier frequency may be excited, and the resulting signal may be classified as a UWB signal.

SUMMARY

Embodiments enable communicating Ultra Wideband (UWB) devices to collaborate with each other by exchanging pulse shape information that can be used for a future ranging exchange. The receiving UWB devices use the pulse shape information to improve the ranging accuracy. The improved ranging accuracy can be used in complex multipath environments where advanced estimation schemes are used to extract an arriving path for time-of-flight estimation. To determine pulse shape information to be shared, some embodiments include determining location information of a UWB device, and selecting the pulse shape information that satisfies regional aspects. The pulse shape information includes a time-zero index specific to a received ranging signal that is used by UWB receivers to establish timestamps for time-of-flight calculations. Some embodiments include measuring performance characteristics and selecting different pulse shape information.

Embodiments include a system, method, and computer program product utilizing a pulse shaping interoperability protocol for Ultra Wideband (UWB) communications. Some embodiments include receiving pulse shape information from another electronic device, where the pulse shape information is used in UWB communications between the electronic device and the another electronic device, receiving a ranging signal that uses first pulse shape information, and determining a distance between the electronic device and the another electronic device based at least in part on the pulse shape information and the ranging signal. Determining the distance includes calculating a time-of-flight associated with the ranging signal. The pulse shape information includes a time-zero index that may be a sample of a main lobe of the pulse shape information (e.g., a first sample or a center sample of a main lobe of the pulse shape information.) The pulse shape information also satisfies one or more regional aspects associated with location information of the electronic device.

Some embodiments include determining performance characteristics of an other ranging signal previously transmitted, determining additional pulse shape information, transmitting the additional pulse shape information to the other electronic device, and transmitting another ranging signal using the additional pulse shape information to the other electronic device. To determine the performance characteristics, some embodiments include measuring an output of an antenna coupled to the one or more processors, and determining that the output of the antenna does not satisfy threshold criteria.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
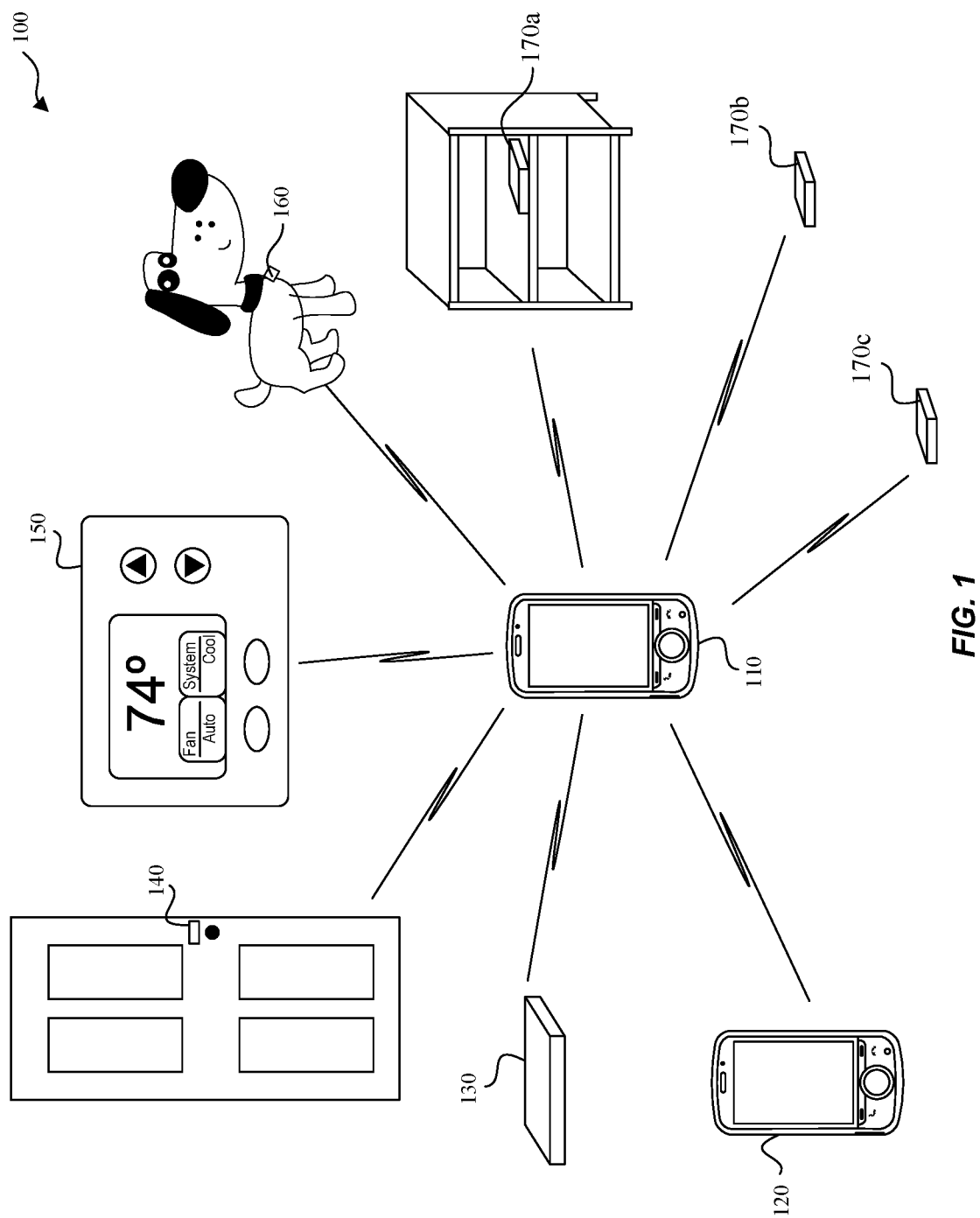
FIG. 1 illustrates an example system implementing a pulse shaping interoperability protocol for Ultra Wideband (UWB) communications, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments enable communicating Ultra Wideband (UWB) devices to collaborate with improved ranging accuracy, especially in complex multipath environments where advanced estimation schemes are used to extract an arriving path for time-of-flight (ToF) calculations. For example, when two UWB stations—station A and station B—first connect, they may exchange explicit pulse shaping information in the form of a waveform describing the pulse, p(t). So station A may signal explicit transmit pulse shape information, $p_A(t)$, to station B, while station B may signal transmit pulse shape $p_B(t)$ to station A. That way, each UWB station's receiver is aware of the other UWB station's pulse shape information and can improve calculations and estimations based at least in part on that known pulse shape information, according to some embodiments.

Precise knowledge of pulse shape information used at a station's transmitter allows the use of receivers that isolate pulse shaping or other filtering effects from true propagation channel effects. Knowledge of the pulse shape information also allows the use of signal processing techniques that may be referred to as "deconvolution" techniques—methods to look at an overall received signal (e.g., end-to-end impulse response from transmitter to receiver) and factor out known artifacts such as, for example, transmitter pulse shaping including antenna effects or receiver transfer characteristics. These signal processing techniques allow extraction of a desired contribution of a wireless propagation channel in the overall system response; in turn, this extraction can be used to determine a time instant of an arriving propagation path.

FIG. 1 illustrates an example system 100 implementing a pulse shaping interoperability protocol for Ultra Wideband (UWB) communications, according to some embodiments of the disclosure. Example system 100 is provided for the purpose of illustration only and is not limiting of the disclosed embodiments. System 100 may include but is not limited to UWB devices such as wireless communication devices 110, 120, vehicular transponder device 130, entry transponder device 140, household device 150, leash tag 160, and anchor nodes 170a-170c. Other UWB devices—which are not shown in FIG. 1 for simplicity purposes—may include other computing devices including but not limited to laptops, desktops, tablets, personal assistants, routers, monitors, televisions, printers, and appliances.

The exchange of pulse shaping information may also be used in a network topology, where more than two UWB devices perform ranging activities. Although a star topology is shown in FIG. 1, peer-to-peer topologies are also possible. For example, wireless communication device 110 may communicate with wireless communication device 120, and wireless communication device 120 may also communicate with one or more other wireless UWB communication devices (not shown).

When wireless communication device 110 is in proximity (e.g., within ten meters, within one meter, etc.) to vehicular transponder device 130 or entry transponder device 140, UWB communications may enable a corresponding car door or entry (e.g., entry of a door to a house) to be unlocked, for example. The desired proximity can be established for the application. Likewise, when wireless communication device 110 is in proximity (e.g., within fifty meters, within twenty meter, within ten meters, etc.) of household device 150, the settings of household device 150 may be adjusted to preferences associated with or stored on wireless communication device 110. In another example, leash tag 160 may be a removable device attached to a pet collar or clothing of a wandering toddler where UWB communications between leash tag 160 and wireless communication device 110 result in an alarm notification on wireless communication device 110 when leash tag 160 exceeds a configurable distance threshold from wireless communication device 110.

The above UWB devices can be portable or mobile, and can determine relative positions and/or distances with each other. Some UWB devices may be stationary and together they may determine absolute positions or geographic locations. For example, anchor nodes 170a-170c may be transponders in fixed locations, such as on a ceiling in a building or a shelf in a store. One or more anchor nodes 170 may be used in conjunction with wireless communication device 110 to improve the accuracy and reliability of ranging activity. In some embodiments, the devices may triangulate and determine a geographic location that may be used to provide local direction information (e.g., a user may obtain directions to find a particular item in a store or supermarket that may be presented on wireless communication device 110.)

Figure 2:
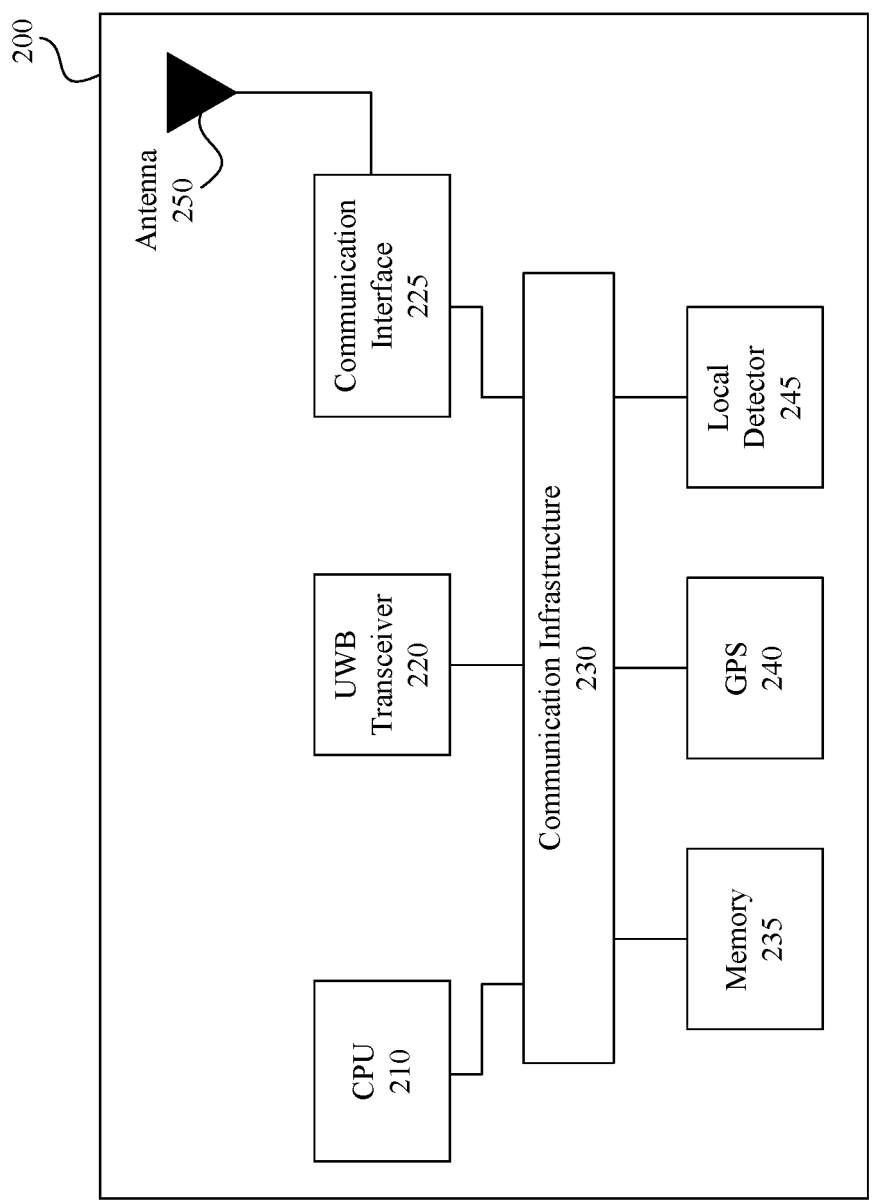
FIG. 2 is a block diagram that illustrates an example system implementing a pulse shaping interoperability protocol for Ultra Wideband (UWB) communications, according to some embodiments of the disclosure.

FIG. 2 is a block diagram that illustrates an example system 200 implementing a pulse shaping interoperability protocol for UWB communications, according to some embodiments of the disclosure. System 200 may include central processing unit (CPU) 210, UWB transceiver 220, communication interface 225, communication infrastructure 230, memory 235, global positioning system (GPS) 240, local detector 245, and antenna 250.

UWB transceiver 220 performs UWB transmit and receive functions, and may be coupled to antenna 250. Communication interface 225 allows system 200 to communicate with other devices that may be wired and/or wireless. Communication infrastructure 230 may be, e.g., a bus or other such interconnect. Memory 235 may include random access memory (RAM) and/or cache, and may include control logic (e.g., computer software) and/or data. GPS 240 determines the location of system 200 and that information may be transmitted to CPU 210 so that pulse shape information may be selected to satisfy regional aspects (e.g., regional government regulations and laws). Antenna 250 may include one or more antennas that may be the same or different types. Local detector 245 may measure antenna outputs to detect, for example, that that the current pulse shape information being used is not satisfactory. The antenna output measurement may be due to antenna load mismatches, impedance mismatches, and/or other antenna output behaviors that may be affected by local and/or context-specific surroundings (e.g., wireless communication device 110 in a shirt pocket adjacent to a UWB audio headset). Issues determined by local detector 245 may result in notification and selection of different pulse shape information for future UWB communications, according to some embodiments. System 200 may also determine when received signal strength indicator (RSSI) levels do not satisfy a given threshold, and thus selection of different pulse shape information may be implemented for future UWB communications.

Figure 3:
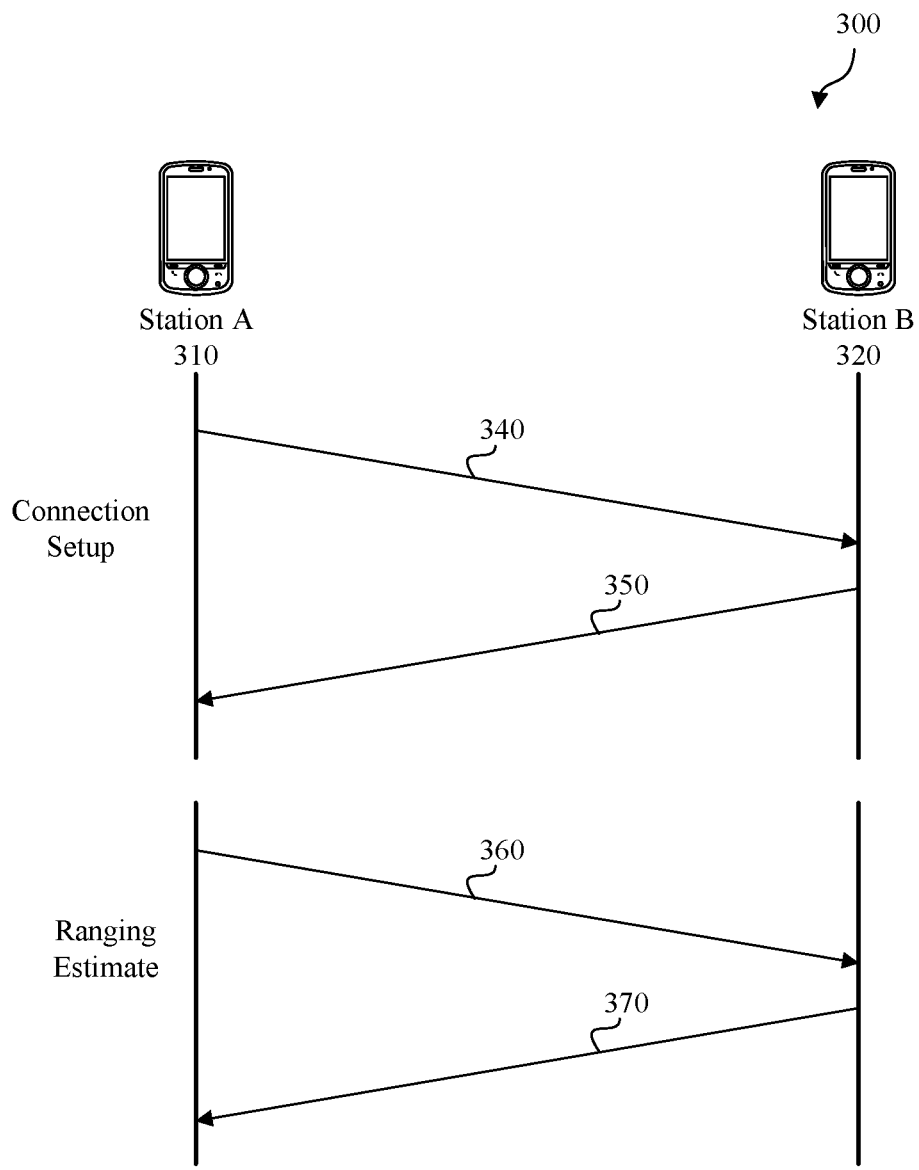
FIG. 3 illustrates an example of a pulse shaping interoperability protocol exchange for Ultra Wideband (UWB) communications, according to some embodiments of the disclosure.

FIG. 3 illustrates an example of a pulse shaping interoperability protocol exchange 300 for Ultra Wideband (UWB) communications, according to some embodiments of the disclosure. In some embodiments, during connection setup when station A 310 (e.g., wireless communication device 110 of FIG. 1) and station B 320 (e.g., wireless communication device 120, vehicular transponder device 130, entry transponder device 140, household device 150, leash tag 160, or anchor nodes 170a-170c of FIG. 1) first connect, they may exchange pulse shape information describing their desired pulse, p(t), that they choose to use for UWB communication. In other embodiments, pulse shape information can be exchanged at any other time prior to a ranging operation.

At 340, for example, station A 310 may transmit pulse shape information regarding station A 310's pulse choice, $p_A(t)$, to station B 320. At 350, station B 320 may transmit pulse shape information regarding station B 320's pulse choice, $p_B(t)$, to station A 310. This way, each station's receiver may be informed of the other station's pulse shape information and improve ranging estimations accordingly.

This "in-the-field" exchange of pulse shape information is beneficial if a specific circuit implementation of station A 310 or station B 320 may operate using one of a variety of antenna types that can affect the pulse shape radiated by the antenna. For example, as a function of the antenna that station A 310 uses, station A 310 may signal the pulse shape information, $p_A(t)$, to station B 320 so that station B 320 may prepare for subsequent ranging events with station A 310.

The connection setup between station A 310 and station B 320—including exchange of pulse shape indices or explicit pulse shape waveform and auxiliary information such as "time-zero" information—can take place on any (wireless or non-wireless) communication channel available between the two stations. In some embodiments, the connection setup and transfer of pulse shape information can take place on a Bluetooth or Wifi (e.g., Wireless LAN) link or another narrowband system, while the ranging signaling and estimation of the range based on the pulse shape information can be carried out via an Impulse Radio UWB system. Data transmission capabilities of the UWB link between stations A 310 and B 320 may be used directly, according to some embodiments.

At 360, during a ranging operation, station A 310 may transmit a ranging signal using pulse $p_A(t)$ to station B 320. At 370, station B 320 may transmit a ranging signal using pulse $p_B(t)$ to station A 310. In addition, stations A 310 and/or B 320 may update pulse shape information in the middle of ranging exchanges, e.g., to adapt to local environmental conditions (e.g., antenna loading). This adaptation to local environmental conditions is described further with respect to FIG. 8 below.

In some embodiments, during connection setup or ongoing ranging exchanges, a UWB station can also request a preferred pulse shape to be used by a peer device, according to some embodiments. This request may be driven by a need to use a low-power estimator mode or to cater to changing propagation (multipath) conditions where the preferred pulse shape may be more suitable than others.

Figures 4A, 4B:
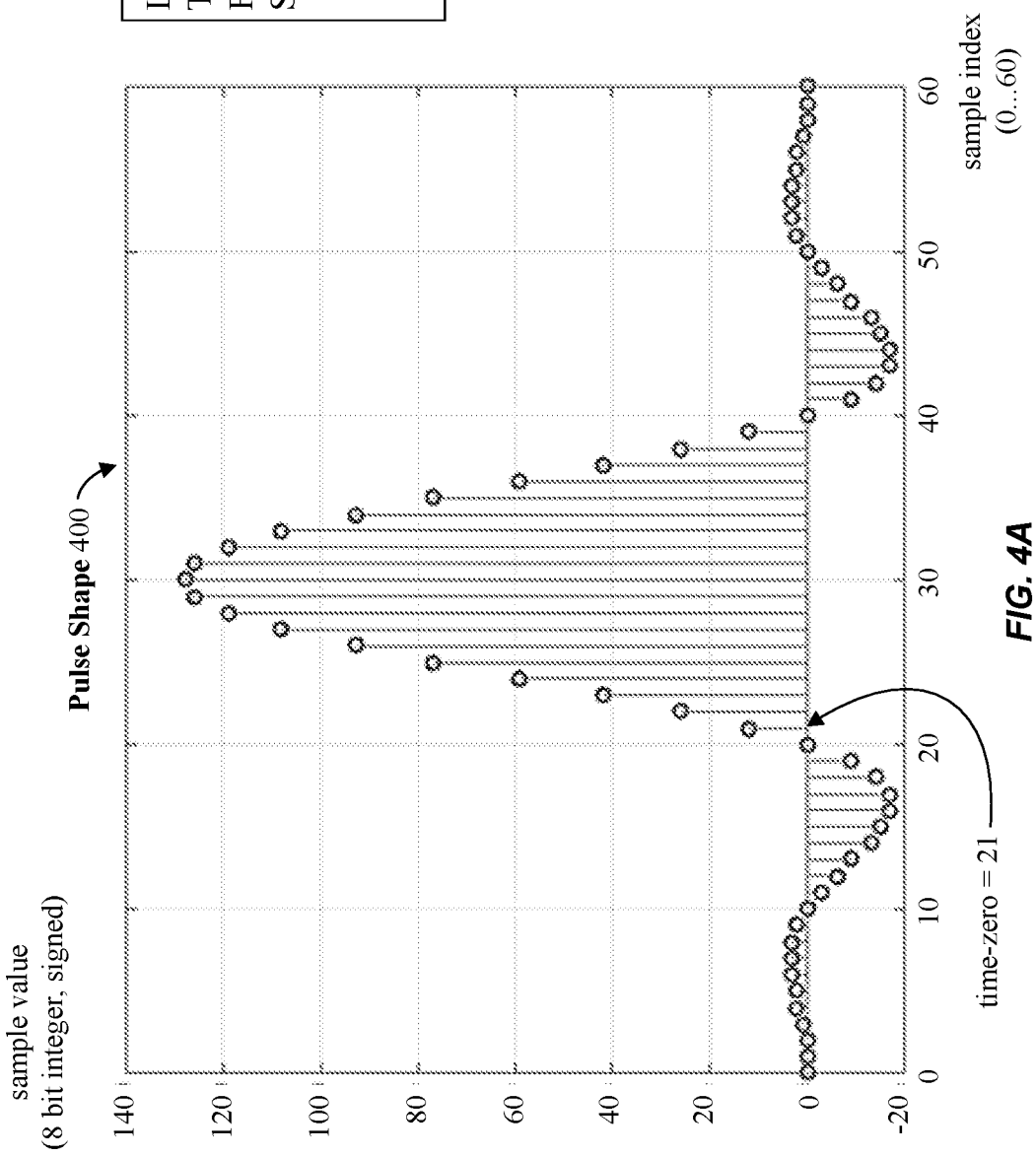
FIG. 4A graphically illustrates an example pulse shape for Ultra Wideband (UWB) communications, according to some embodiments of the disclosure.
FIG. 4B illustrates an example data representation of a pulse shape for Ultra Wideband (UWB) communications, according to some embodiments of the disclosure.

FIG. 4A graphically illustrates an example pulse shape 400 for Ultra Wideband (UWB) communications, according to some embodiments of the disclosure. FIG. 4B illustrates an example data representation of pulse shape 400 for Ultra Wideband (UWB) communications, according to some embodiments of the disclosure. The pulse shape information can be conveyed in the form of a sequence (series) of waveform samples at a suitable sampling rate. For instance, a pulse waveform spanning 10 ns may use a description that provides a sample value every 100 ps, for a total of 100 sample values. In FIGS. 4A and 4B, the length of sample values is set at 61 as reflected in the sample index of (0-60). Each sample value may be represented digitally with a certain resolution such as, for example, 8 bits per sample. Note that the time resolution of the pulse waveform (e.g., 100 ps or a finer or coarser time step) communicated between UWB devices may either be standardized or may be signaled along with the pulse waveform. In general, the samples may be complex-valued (e.g., contain real and imaginary parts) to represent equivalent baseband arbitrary pulse waveforms that may be emitted in a passband around a desired carrier frequency.

FIGS. 4A and 4B illustrate the concept of time-zero of a pulse. Stations A 310 and B 320 have a common notion of what they refer to as the "center" of the pulse to determine their respective time instant references to calculate ToF measurements. For instance, transmitting station A 310 may use as time instant reference, the time the main peak of its pulse $p_A(t)$ left the antenna. Assuming that FIGS. 4A and 4B represent $p_A(t)$, then time-zero=index 21; meanwhile, receiving station B 320 may expect a signal based on pulse $p_A(t)$ and estimate the arrival of $p_A(t)$. Station B 320 may use a different time reference point to calculate the ToF associated with received pulse $p_A(t)$ such as, for example, a center of the main peak of pulse $p_A(t)$ it receives as a time reference (e.g., time-zero=index 30), a "center of gravity approach," or other metric not targeting the largest peak to refer to the time instant reference that station B 320 records as the arrival time of pulse $p_A(t)$. With the different time instant references for $p_A(t)$ used by stations A 310 and B 320, an inaccurate time-of-flight calculation—and ultimately, poor quality UWB communications—can result.

Unless both stations A 310 and B 320, use a common agreed-upon point time-zero in pulse shape $p_A(t)$, the ToF may not be unambiguously extracted. In some embodiments, along with the pulse shape waveform, the sample index representing time-zero, e.g., the time instant reference used for time stamps, is communicated between UWB stations.

FIG. 4B includes data that conveys example pulse shape information of pulse shape 400 of FIG. 4A, according to some embodiments. The information may be in the form of the structured table data that includes the following:

number of samples: LENGTH=61;
time-zero sample index: TIME_ZERO=21;
assumed sample rate FSAMP: as an oversampling factor 20 relative to an implied reference rate corresponding to the pulse rate of, e.g., 499.2 MHz; and
individual sample values in, e.g., 8 bits representation: SAMPLES={0, 0, 0, 1, 2, 2, 3, . . . }, which in this example would include 61 values correlating with the number of samples. In some embodiments, the samples may be complex-valued, so there may be two sample sequences SAMPLES_REAL and SAMPLES_IMAG, to represent the real and imaginary parts of the effective complex baseband pulse representation, respectively.

The above information is exemplary and based on the disclosure herein, a person of ordinary skill in the art will recognize that the pulse shape information can include other types of information. These other types of information are within the spirit and scope of the present disclosure.

In some embodiments, impulse-Radio UWB systems can be used to transmit the pulse shape information (e.g., in digital form) between different wireless stations. Also, due to the high bandwidth and short temporal length of the pulses, these systems lend themselves to precisely estimate the "range" (distance) between associated UWB wireless nodes. In some embodiments, the range can be calculated based on ToF measurements between the time of departure of the signal at station A 310 and arrival of the signal at station B 320.

Other UWB systems may include a compliance check for a pulse shape, p(t). An issue with the compliance check for the pulse shape, p(t), is that it may be insufficient and may create interoperability problems. For example, when two different pulse shapes that each satisfies the compliance check are transmitted from station A to station B, the respective propagated signals received at station B may be substantially the same. Thus, uncertainty and inaccuracy exists in determining (or determining an estimate of) the distance (e.g., the range) between a transmitter and a receiver.

Figure 10:
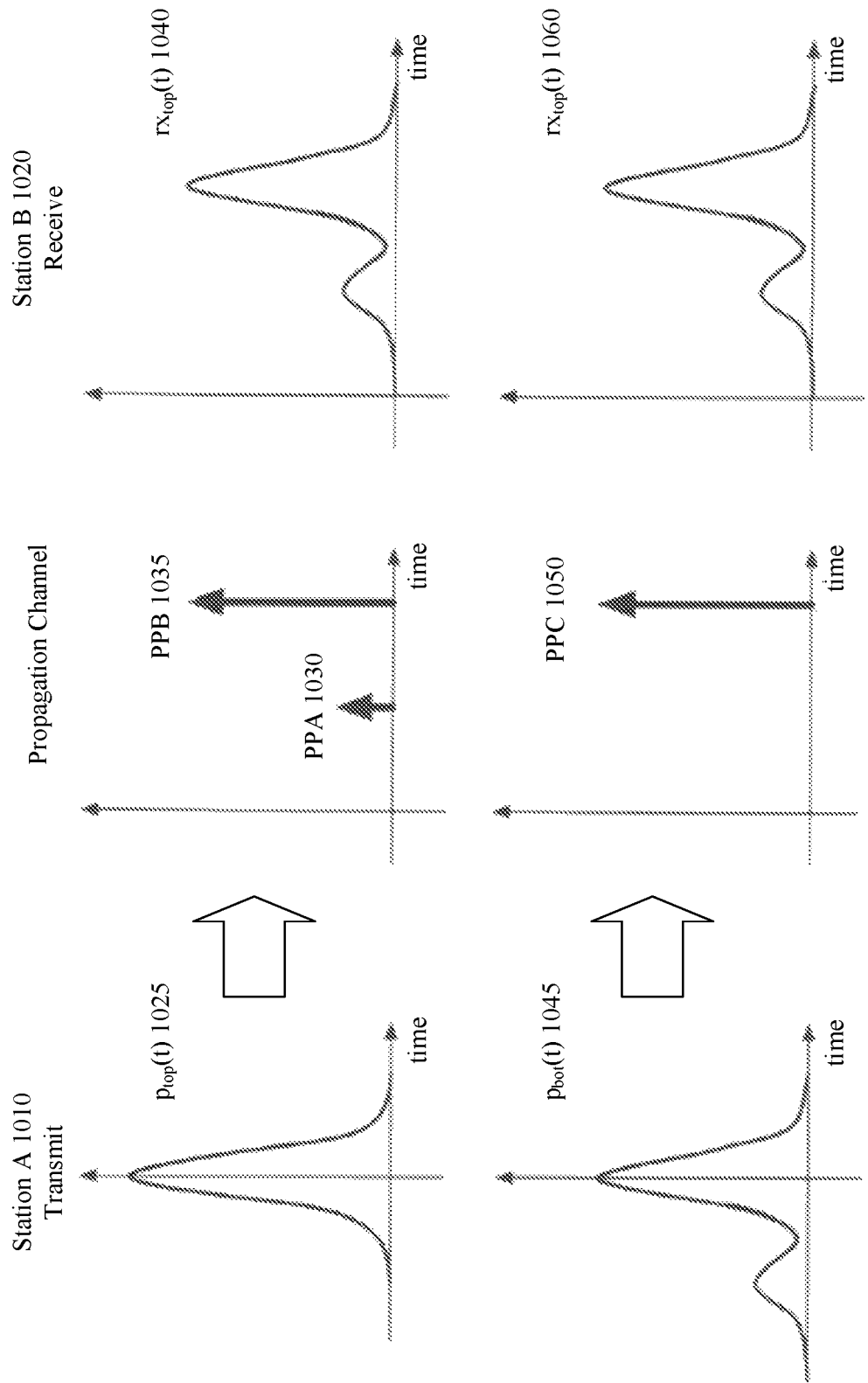
FIG. 10 illustrates ambiguities in distinguishing pulse effects from propagation channel effects using compliant pulses.

For example, FIG. 10 illustrates ambiguities in distinguishing pulse effects from propagation channel effects using compliant pulses. Station A 1010 may be a mobile UWB device and station B 1020 may be a mobile or stationary UWB device. When station A 1010 and station B 1020 are close together, compliant pulse $p_{top}(t)$ 1025 is transmitted from station A 1010 through a wireless propagation channel with two propagation paths: an arriving line of sight (LOS), PPB 1035 and a reflection PPA 1030. The receive signal $rx_{top}(t)$ 1040 received at station B 1020 exhibits two peaks. To demonstrate the ambiguity, when station A 1010 and station B 1020 are farther apart than before, station A 1010 may also transmit another compliant pulse, $p_{bot}(t)$ 1045, that has a sidelobe—in this case a single sidelobe before the main lobe—to station B 1020. In the propagation channel, there is a single LOS propagation path, PPC 1050. The corresponding receive signal, $rx_{bot}(t)$ 1060, received at station B1020 appears identical to the receive signal $rx_{top}(t)$ 1040. This can pose a challenge to a receiver at station B, as the identical received waveforms can be based on a range-determining propagation path PPB or PPC. Although the two scenarios differ substantially in their geometry at the transmitter, the receiver at Station B 1020 cannot distinguish between the top scenario (based on the LOS path, PPB 1035) where stations A 1010 and B 1020 are closer in range than in the bottom scenario where the range determination is based on the LOS path, PPC 1050, that arrives much later.

Figure 5:
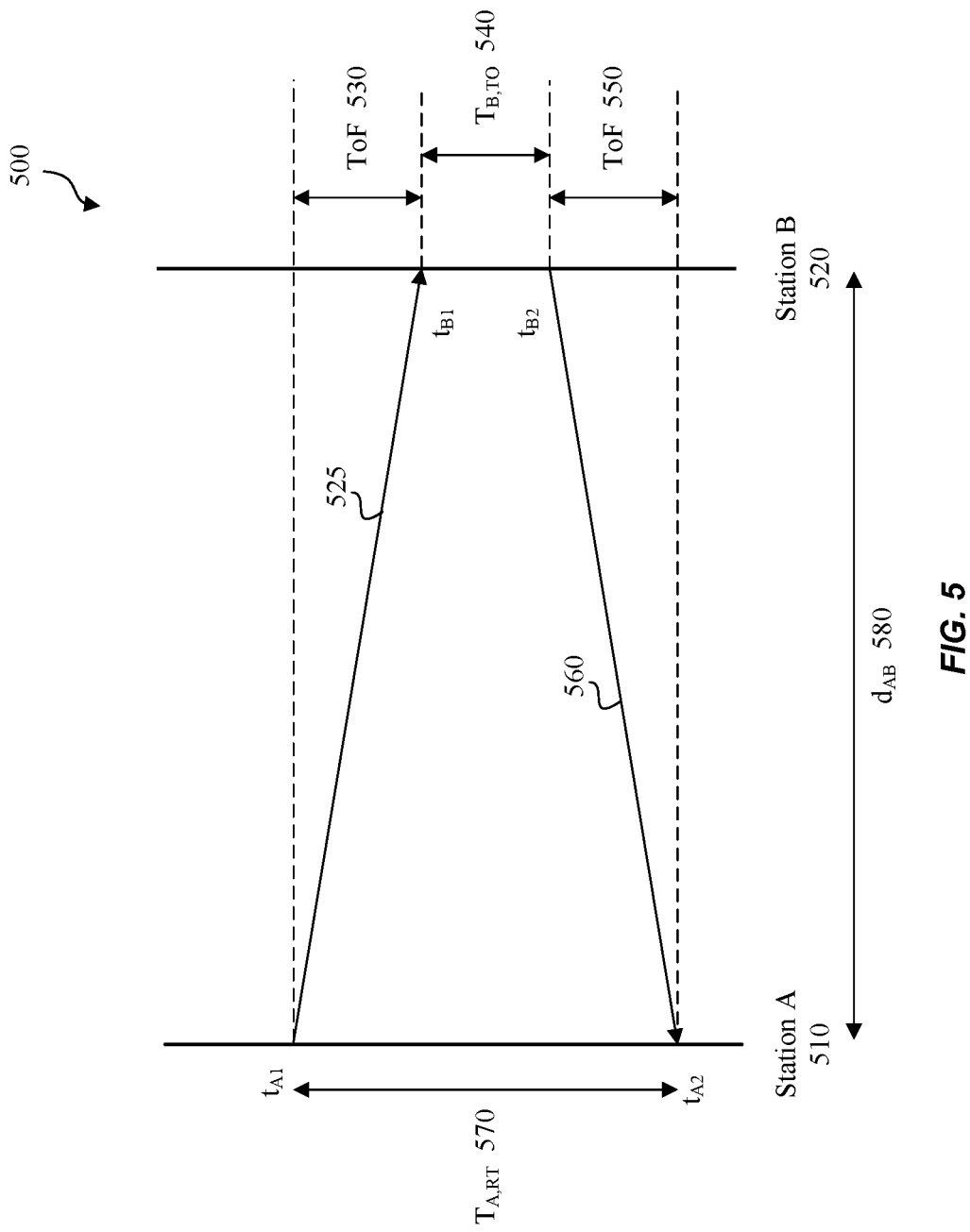
FIG. 5 illustrates an example ranging scenario utilizing time-of-flight (ToF), according to some embodiments of the disclosure.

The above issues in other UWB systems, among other things, are addressed by the embodiments described herein. For example, FIG. 5 illustrates an example ranging scenario 500 utilizing time-of-flight (ToF), according to some embodiments of the disclosure. As a convenience and not a limitation, FIGS. 5-8 are described with regard to elements in FIGS. 1-3, 4A, and 4B to demonstrate how pulse shape information conveyed improves the accuracy of ToF calculations and hence improves UWB device interoperability in UWB communications.

Station A 510 and station B 520 are substantially the same as station A 310 and station B 320 of FIG. 3, respectively. Further, transmissions 525 and 560 are substantially the same as transmissions 360 and 370 of FIG. 3, respectively.

At time, $t_{A1}$, wireless UWB signal 525 based on $p_A(t)$, leaves the antenna at station A 510. Note that $t_{A1}$ is determined by station A 510 based on station A's time-zero (e.g., FIGS. 4A and 4B pulse $p_A(t)$'s time-zero=index 21). The distance between stations A 510 and B 520, $d_{AB}$ 580, is unknown before the ranging measurement and is the desired quantity. At time $t_{B1}$, wireless UWB signal 525 arrives at the antenna input of station B 520. Station B 520 determines $t_{B1}$ based on the time-zero index of 21 based on the pulse shape information (e.g., FIG. 4B) that station B 320 previously received via 340 from station A 310 of FIG. 3. Thus, knowing time-zero for wireless UWB signal 525 (or $p_A(t)$) is important for determining ToF and subsequently, calculating the distance $d_{AB}$ 580 shown below.

ToF 530 of wireless UWB signal 525 is given by a temporal difference:

$$\text{ToF} = t_{B1} - t_{A1}. \quad (\text{Eq. 1})$$

Note that assuming wireless UWB signal 525 is traveling at the speed of light c, which is an acceptable approximation in air, the range of $d_{AB}$ 580 can be calculated as follows:

$$d_{AB} = \text{ToF}/c = (t_{B1} - t_{A1})/c. \quad (\text{Eq. 2})$$

For the range calculation in Eq. 2, ToF 530 (or, equivalently, the difference between time instances $t_{A1}$ and $t_{B1}$) needs to be calculated. In some embodiments, stations A and B operate as a synchronized system with a common clock (or time) reference, such as the global time (GMT or otherwise common time base) with high precision and fine resolution. In such a synchronized system, station A 510 can measure a time of departure of wireless UWB signal 525 at $t_{A1}$, and station B 520 can measure a time of arrival of wireless UWB signal 525 at $t_{B1}$ based on the common clock reference. Once both $t_{A1}$ and $t_{B1}$ are available, ToF 530 and range $d_{AB}$ 580 can be calculated using equations (1) and (2).

In systems where stations A 510 and B 520 do not operate using a common clock reference synchronized between these two stations, stations A 510 and B 520 may have their own respective local clocks. The local clocks used to measure $t_{A1}$ and $t_{B1}$ in stations A 510 and B 520, respectively, can have an unknown offset with respect to each other and may operate at different clock speeds. Thus, the ranging calculation using equations (1) and (2), as described above, may be inaccurate.

In some embodiments, to overcome the inaccuracy with stations that have a local clock, a Two-Way-Ranging (TWR) approach may be used. In TWR, after receiving wireless UWB signal 525, station B 520 switches from receive mode to transmit mode. After a receive-to-transmit turnaround time $T_{B,TO}$ 540, station B 520 sends a second signal wireless UWB signal 560 to station A 510 at time $t_{B2}$. In some embodiments, station B 520 determines $t_{B2}$ based on a second time-zero value associated with a pulse $p_B(t)$ selected by station B 320. The second time-zero value is conveyed during a connection setup from station B 320 to station A—see 350 of FIG. 3. Wireless UWB signal 560 arrives at station A 510 at time $t_{A2}$. Station A 510 determines $t_{A2}$ based on the second time-zero value. Thus, the conveyance of respective time-zero values enables stations A 510 and B 520 to accurately determine timestamps to determine ToF values.

A delay of wireless UWB signal 560 to travel from station B 520 to station A 510 (across a wireless medium) can be represented by ToF 550.

The desired range $d_{AB}$ 580 can be extracted. Station A 510 measures the total round-trip time $T_{A,RT} = t_{A2} - t_{A1}$. This measurement is based on station A 510's local clock. Station B 520 measures the time it takes between reception of wireless UWB signal 525 and transmission of wireless UWB signal 560, $T_{B,TO} = t_{B2} - t_{B1}$. This measurement is based on station B 520's local clock.

ToF 530 or ToF 550 (they are equal) can be calculated as follows:

$$\text{ToF} = (T_{A,RT} - T_{B,TO})/2 = \{(t_{A2} - t_{A1}) - (t_{B2} - t_{B1})\} \quad (\text{Eq. 3})$$

Thus, $d_{AB}$ 580 may be calculated using Eq. (2) as follows:

$$d_{AB} \text{ToF}/c = \{(t_{A2} - t_{A1}) - (t_{B2} - t_{B1})\}/c.$$

The calculation of Eqs. (2) and/or (3) may be carried out by station A 510, station B 520, or some other node in system 100 (not shown) that is supplied with both $T_{A,RT}$ and $T_{B,TO}$. If one of stations A 510 or B 520 is in charge of this calculation, the respective missing quantity, $T_{A,RT}$ or $T_{B,TO}$, is communicated to the other station through the wireless link or another means of communication. If a different networking node other than stations A or B is responsible to calculate the ToF and range, stations A 510 and B 520 will need to relay $T_{A,RT}$ and $T_{B,TO}$ to the other node.

Thus, the conveyance of pulse shape information for $p_A(t)$ depicted in FIG. 4A and included in FIG. 4B, as well as the pulse shape information for $p_B(t)$ (represented at 350 of FIG. 3) especially time-zero information, enables accurate calculations of the ToF.

Figure 6:
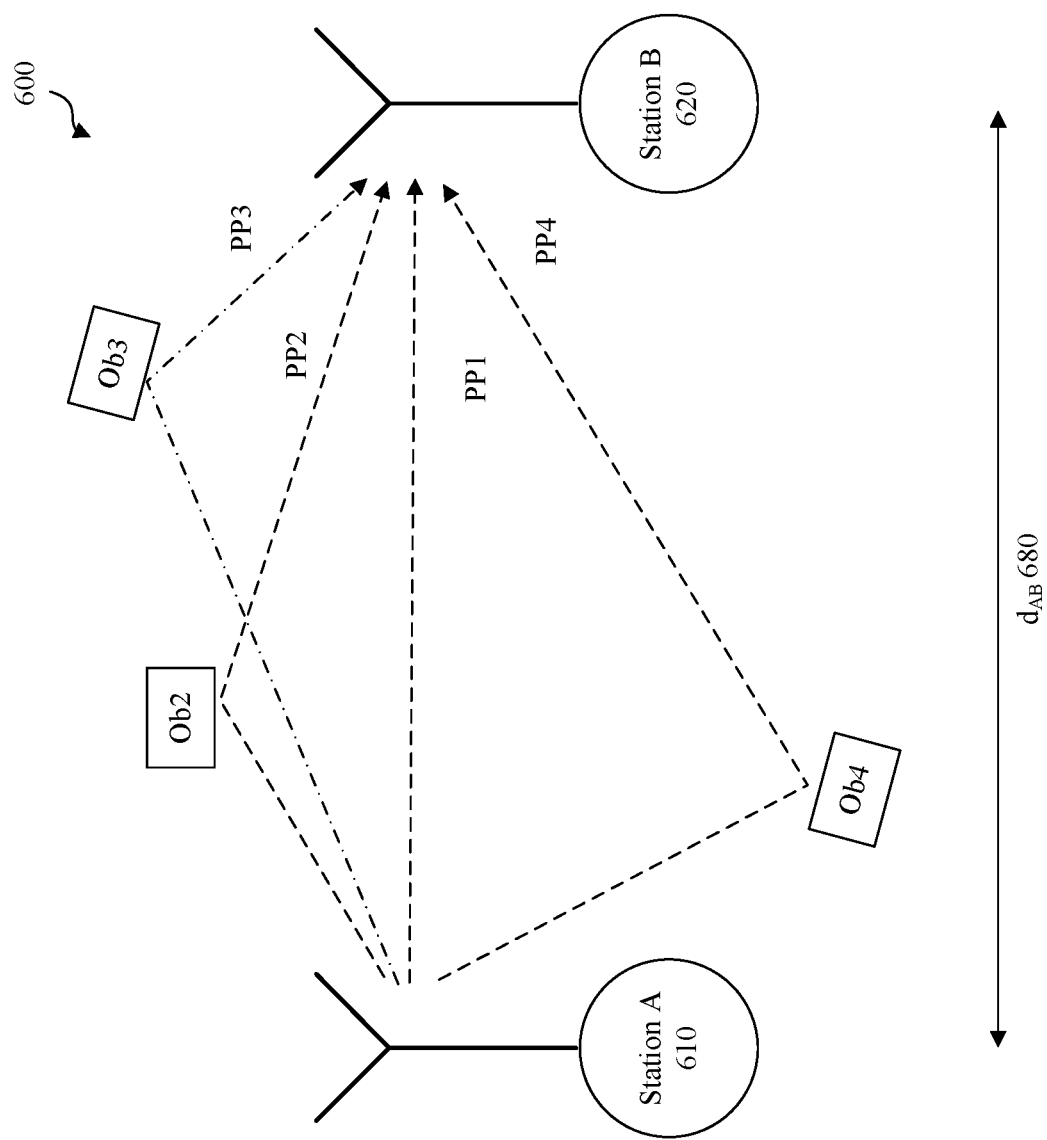
FIG. 6 illustrates an example ranging scenario with scattered objects, according to some embodiments of the disclosure.

FIG. 6 illustrates an example ranging scenario 600 with scattered objects, according to some embodiments of the disclosure. Station A 610 and station B 620 are substantially the same as station A 310 and station B 320 of FIG. 3, respectively. Further, transmission PP1 is substantially the same as transmission 360 of FIG. 3.

Scenario 600 illustrates an environment with scattered objects labeled Ob2, Ob3, and Ob4, that act as reflectors of a wireless UWB signal transmitted by station A 610 to station B 620. A first and direct/line-of-sight (LOS) propagation path is shown as PP1 and additional propagation paths are shown as PP2, PP3, and PP4. Propagation paths PP2-PP4 take longer to arrive at station B 620, as each effective distance is greater. Using an abstract, idealized model of an infinitely sharp pulse emitted by station A 610, receiver station B 620 receives multiple copies of the signal that arrive at different times, as illustrated in FIG. 7.

In some embodiments, ternary sequences and repetition thereof in UWB systems can be used for a UWB system to extract various propagation paths, along with the direct/LOS propagation path, to estimate the range in the presence of noise and/or interference. Since the sequence of ternary pulses emitted by the transmitter at station A 610 is known to the receiver at station B 620, the latter can use correlation and averaging techniques to determine a channel impulse response (CIR); that is, the line-up of propagation paths as illustrated in the example with pulses PR1, PR2, PR3, PR4 shown in FIG. 7.

Figure 7:
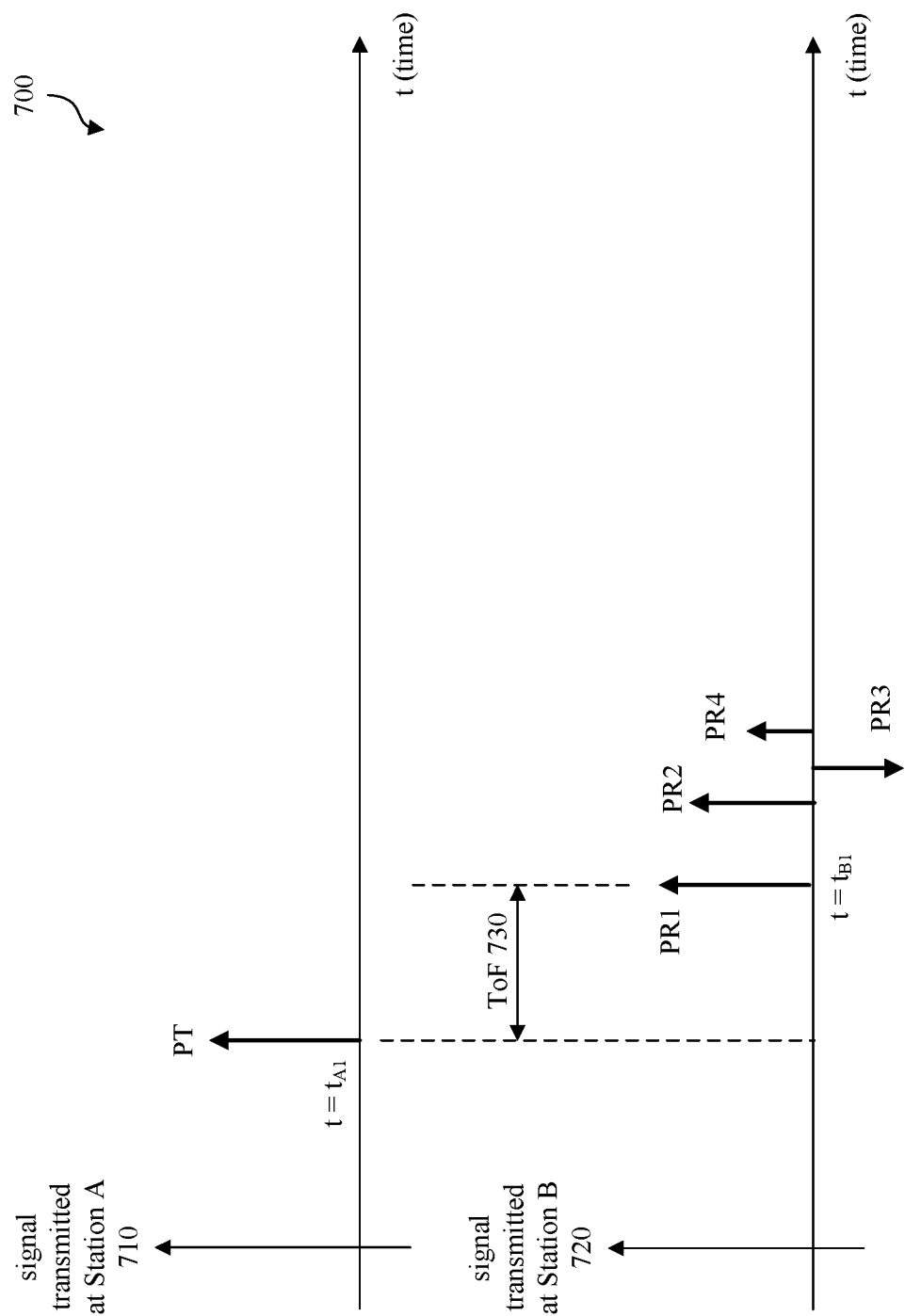
FIG. 7 illustrates an example ranging scenario with scattered objects utilizing time-of-flight (ToF), according to some embodiments of the disclosure.

FIG. 7 illustrates an example ranging scenario 700 with scattered objects utilizing time-of-flight (ToF), according to some embodiments of the disclosure. Station A 710 and station B 720 are substantially the same as station A 610 and station B 620 of FIG. 6. Further, transmission PT is substantially the same as transmission PP1 of FIG. 6.

The propagated transmit signal PT from station A 710 translates into four propagated receive signals PR1, PR2, PR3, and PR4 at station B 720. The direct propagation path PP1, which is assumed to be the LOS path, is shown as PR1 and represents a LOS distance between stations A 710 and B 720. Station B 720 determines the first propagation path PP1 (or PR1) from later propagation paths PR2, PR3, and PR4 to extract the ToF parameter corresponding to the range between stations A 710 and B 720. Station B 720 extracts the time instant the first propagation path is received at $t_{B1}$ as discussed above so that the range between stations A 710 and B 720 under multipath conditions may be determined.

For example, using Eqs. (1) and (2), ToF 730 may be determined as follows:

$ToF = t_{B1} - t_{A1}$; and subsequently, $d_{AB}$ 680 may be determined as:

$$d_{AB} = ToF/c = (t_{B1} - t_{A1})/c.$$

Time $t_{A1}$ represents the time that propagated transmit signal PT leaves the antenna at station A 710, as determined by station A 710 based on station A 710's time-zero. Station B 720 determines time $t_{B1}$ based on a time-zero based on the pulse shape information $p_A(t)$ (e.g., FIG. 4B) that station B 320 previously received via 340 from station A 310 of FIG. 3. Thus, knowing time-zero for propagated transmit signal PT (or $p_A(t)$) is important for determining ToF 730, and subsequent calculation of the ranging distance between stations A 710 and B 720. Thus, the conveyance of pulse shape information and the time-zero information in particular enables accurate ranging and improves interoperability among UWB devices.

Figure 8:
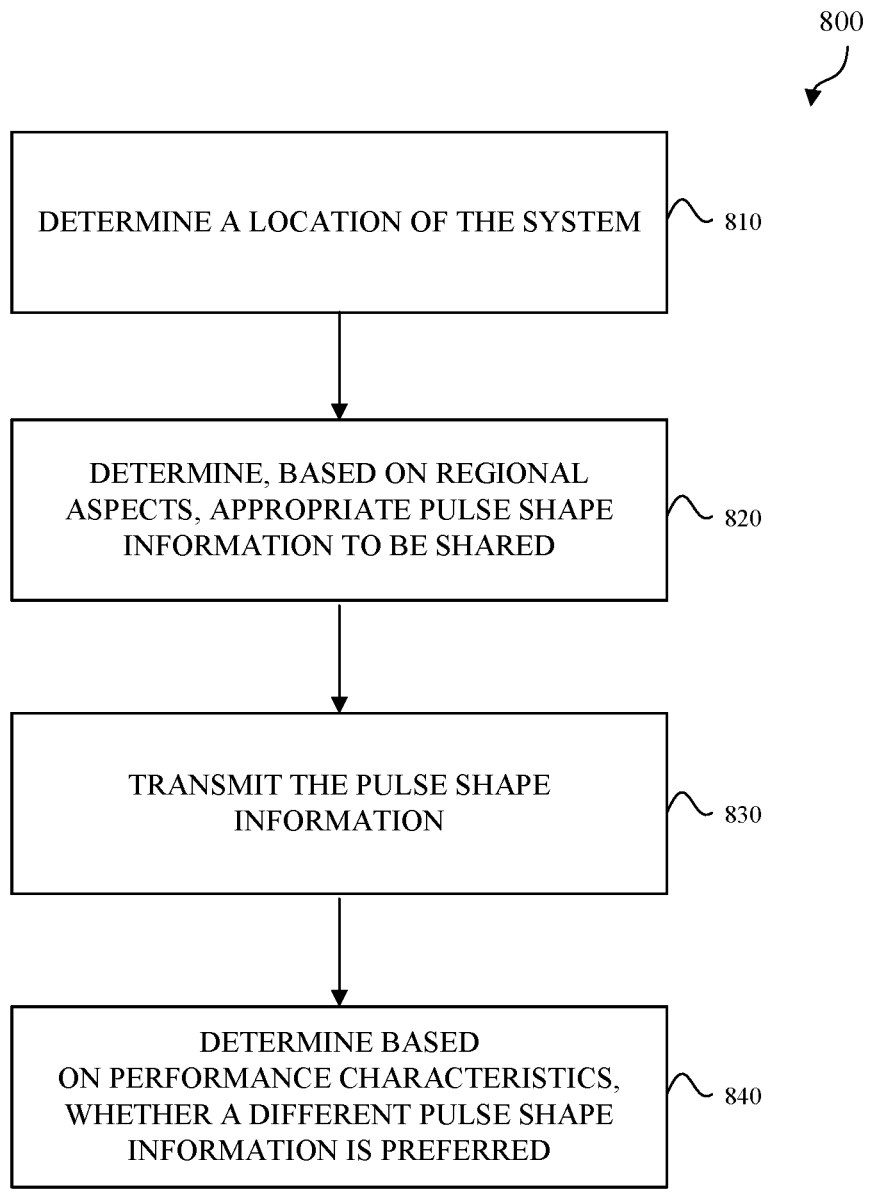
FIG. 8 illustrates an example method for determining pulse shape information, according to some embodiments of the disclosure.

FIG. 8 illustrates an example method 800 for determining pulse shape information, according to some embodiments of the disclosure. Method 800 may be performed by any UWB stations as described in system 100 of FIG. 1 and system 200 of FIG. 2. As an example, method 800 may be performed by system 200 where CPU 210 may execute instructions stored in a computer-readable medium of memory 235 to perform the operations of method 800.

Method 800 begins at 810 where system 200 determines its location. For example, if a user travels to another country (e.g., Japan or France) and turns on wireless communication device 110 of FIG. 1 (also system 200 of FIG. 2), GPS 240 may determine a location for system 200. CPU 210 may receive location information from GPS 240 or via CPU 210, for example.

At 820, system 200 determines, based on the determined location and regional aspects, an appropriate pulse shape information that system 200 plans to use and to be shared with other UWB devices. As an example, CPU 210 may determine, based on tables stored in memory 235, the pulse shape information that satisfies the regional aspects such as government regulations, regional laws, and/or local rules.

For example, a wireless device may operate at different carrier frequencies and in different regulatory regions (e.g., US/FCC, Europe/ETSI, etc.), and each region may have specific rules and constraints on allowed spectral mask, power spectral density limits, or ways to measure various metrics to determine compliance in the region. Therefore, a transmitter in the wireless device may need to adjust its pulse shape optimally based on the wireless device's region to maximize spectral use and performance potentials. Optimal transmitter circuit properties may be context-dependent and dependent on the wireless device's region. Once the transmitter adjusts the pulse shape accordingly, a ranging receiver may need to adjust its local processing to cater to the transmitters new signaling properties. Thus, as described herein, the ability to exchange pulse shapes between associated devices assists in maximizing system performance from region to region.

At 830, system 200 transmits the pulse shape information to another UWB station, during connection setup, for example. The pulse shape information includes information—such as, for example, the information described above in FIG. 4B—that is transmitted via UWB transceiver 220, communication interface 225, and antenna 250. In some examples UWB transceiver 220 is coupled directly to antenna 250.

At 840, system 200 analyzes various performance characteristics including but not limited to received signal strength indicator (RSSI) and notifications from local detector 245 and determines whether different pulse shape information should be used. If system 200 determines that different pulse shape information is preferable, method 800 may select the appropriate pulse shape information that also satisfies regional aspects (e.g., at 820) and transmits the appropriate pulse shape information to UWB stations accordingly (e.g., at 830).

The embodiments discussed above describe a process or protocol with message exchanges between participating UWB stations. As discussed above, pulse shape information can be exchanged between UWB stations. Such exchanges have, among others, the following benefits:

Resolves ambiguities in pulse shape definitions and thereby facilitates successful operation of ranging estimation in dense multipath environments.

Improves achievable ranging accuracy while maintaining implementers' degree of freedom to design a circuit that best suits design processes and hardware constraints.

Improves flexibility to adjust system parameters to changing environments (hardware/platform changes, multipath environments, etc.).

Improves performance for "Angle-of-Arrival" estimation in UWB receivers utilizing multiple receive antennas.

Improves receive sensitivity of the data detection parts of UWB receivers as the receiver can be optimally matched to the transmitters waveform.

Improves ranging accuracy by allowing adjustment of pulse shaping as a function of regulatory constraints, including carrier frequency, regulatory region, and others.

Figure 9:
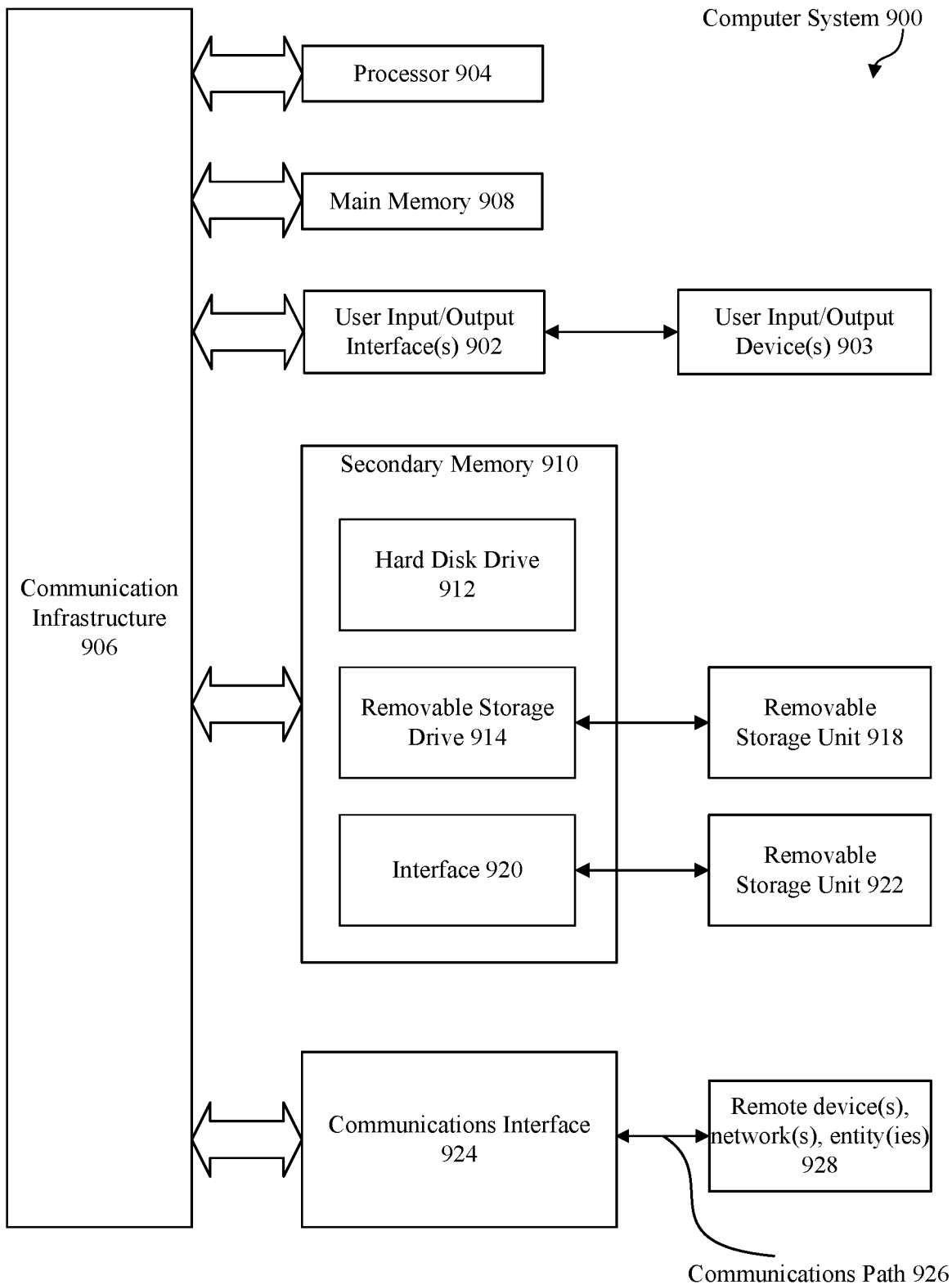
FIG. 9 is an example computer system useful for implementing some embodiments or portion(s) thereof.

Various embodiments can be implemented, for example, using one or more computer systems, such as computer system 900 shown in FIG. 9. Computer system 900 can be any well-known computer capable of performing the functions described herein. For example, and without limitation, electronic devices such as laptops, desktops as described with regard to FIG. 1, the other node in system 100 as described with respect to FIG. 5, and/or other apparatuses and/or components shown in the figures. The laptops and desktops or other UWB devices may include the functions as shown in system 200 of FIG. 2 and/or some or all of the functions of system 900 of FIG. 9. For example, computer system 900 can be used in wireless devices to exchange pulse shape information—as described above—among UWB devices.

Computer system 900 includes one or more processors (also called central processing units, or CPUs), such as a processor 904. Processor 904 is connected to a communication infrastructure or bus 906. Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device comprising:
   a transceiver; and
   one or more processors communicatively coupled to the transceiver and configured to:
   prior to a ranging operation, receive via the transceiver, a time instant reference from an other electronic device, wherein the time instant reference is used to process Ultra Wideband (UWB) communications between the electronic device and the other electronic device;
   during the ranging operation, receive via the transceiver, a ranging signal based at least in part on the time instant reference; and
   determine an estimated distance between the electronic device and the other electronic device based at least in part on the time instant reference and the ranging signal.

2. The electronic device of claim 1, wherein the time instant reference identifies a first sample of a main peak of the ranging signal.

3. The electronic device of claim 1, wherein the time instant reference identifies a center sample of a main peak of the ranging signal.

4. The electronic device of claim 1, wherein the one or more processors are further configured to: receive pulse shape information that satisfies one or more regional aspects associated with a location of the electronic device.

5. The electronic device of claim 1, wherein to determine the estimated distance, the one or more processors are configured to calculate a time-of-flight associated with the ranging signal.

6. The electronic device of claim 1, wherein the one or more processors are further configured to:
   determine one or more performance characteristics of another ranging signal previously transmitted;
   determine a different time instant reference;
   transmit the different time instant reference to the other electronic device; and
   transmit another ranging signal using the different time instant reference to the other electronic device.

7. The electronic device of claim 6, wherein to determine the one or more performance characteristics, the one or more processors are configured to:
   measure an output of an antenna communicatively coupled to the one or more processors; and
   determine that the output of the antenna does not satisfy a threshold criteria.

8. The electronic device of claim 7, wherein the one or more processors are further configured to determine an antenna load mismatch.

9. The electronic device of claim 7, wherein the one or more processors are further configured to determine an impedance mismatch.

10. The electronic device of claim 1, wherein the one or more processors are further configured to:
    request a preferred pulse shape to be used by the other electronic device;
    receive via the transceiver, a second ranging signal based at least in part on the preferred pulse shape; and
    determine a second estimated distance between the electronic device and the other electronic device based at least in part on the preferred pulse shape and the second ranging signal,
    wherein the preferred pulse shape comprises a second time instant reference.

11. The electronic device of claim 1, wherein the ranging signal includes a plurality of samples, and wherein the time instant reference identifies a particular sample of the plurality of samples to be used as a time reference for receipt of the ranging signal by the electronic device.

12. The electronic device of claim 1, wherein the one or more processors are further configured to:
    exchange via the transceiver, desired pulse shape information with the other electronic device;
    transmit a second ranging signal based at least in part on the desired pulse shape information; and
    receive a third ranging signal based at least in part on the desired pulse shape information including a desired pulse shape, p(t).

13. A method comprising:
    prior to a ranging operation, receiving, via a transceiver, a time instant reference from an other electronic device, wherein the time instant reference is used in processing Ultra Wideband (UWB) communications between an electronic device and the other electronic device;
    during the ranging operation, receiving, via the transceiver, a ranging signal based at least in part on the time instant reference; and
    estimating a distance between the electronic device and the other electronic device based at least in part on the time instant reference and the ranging signal.

14. The method of claim 13, wherein the time instant reference identifies a center sample of a main peak of the ranging signal.

15. The method of claim 13, wherein the time instant reference identifies a first sample of a main peak of the ranging signal.

16. The method of claim 13, wherein the time instant reference satisfies one or more regional aspects associated with a location of the electronic device.

17. The method of claim 13, further comprising:
    determining a performance characteristic of a previously transmitted ranging signal;
    determining a different time instant reference;

transmitting the different time instant reference to the other electronic device; and transmitting another ranging signal using the different time instant reference to the other electronic device.

18. The method of claim 13, wherein the ranging signal includes a plurality of samples, and wherein the time instant reference identifies a particular sample of the plurality of samples to be used as a time reference for receipt of the ranging signal by the electronic device.

19. A non-transitory computer-readable medium having instructions stored therein, which when executed by one or more processors in an electronic device cause the one or more processors to perform operations for utilizing a pulse shaping interoperability protocol for Ultra Wideband (UWB) communications, the operations comprising:

prior to a ranging operation, receiving, via a transceiver, a time instant reference from an other electronic device, wherein the time instant reference is used to process a ranging signal that is received from the other electronic device subsequent to the receipt of the time instant reference, wherein the time instant reference satisfies one or more regional aspects associated with a location of the electronic device;

during the ranging operation, receiving, with the electronic device, the ranging signal based at least in part on the time instant reference; and computing a distance between the electronic device and the other electronic device based at least in part on the time instant reference and the ranging signal.

20. The non-transitory computer-readable medium of claim 19, wherein the ranging signal includes a plurality of samples, and wherein the time instant reference identifies a particular sample of the plurality of samples to be used as a time reference for receipt of the ranging signal by the electronic device.

* * * * *